United States Patent Office 3,375,133
Patented Mar. 26, 1968

3,375,133
ULTRASONIC METHOD FOR TREATING SINTERED BEARINGS
James J. Scott, Bedminster, N.J., assignor to Bound Brook Bearing Corporation of America, Middlesex, N.J., a corporation of Delaware
No Drawing. Filed Mar. 31, 1964, Ser. No. 356,071
3 Claims. (Cl. 134—1)

ABSTRACT OF THE DISCLOSURE

Interstitially trapped metallic particles are removed from oil-impregnated sintered metal bearings by immersing the bearings in a petroleum aliphatic solvent of low viscosity to insure the effective coupling of the bearings with a source of ultra-sonic impulses, of low solvency to preserve the impregnating oil, and of high volatility to permit rapid drying at ambient temperature to avoid surface blemishes, the solvent used having a Kauri Butanol value within the range of 25 to 50, and an ASTM distillation range of no more than 40° F., elevating the temperature of the solvent to about 150° F., subjecting the bearings so immersed to the action of ultra-sonic impulses within the range of 30,000 to 35,000 cycles per second for a period of 3 to 5 minutes to remove interstitial free particles of metal powder of which the bearings are formed, and thereafter removing the bearings from the solvent and permitting the same to dry at ambient temperature under an exhaust hood whereby the drying operation is accelerated and the driving off of impregnating oil by elevated temperature is avoided.

---

This invention relates to the treatment of oil-impregnated sintered metal bearings.

More particularly, the invention relates to a method for treating sintered metal bearings to render them noiseless and thus adapt them to use in high fidelity sound recording and reproducing equipment.

So-called sintered oil-less bearings are ordinarily formed of copper and tin powders pressed to the required shape, sintered, and then impregnated with a lubricant. A lubricant commonly used for this purpose is a turbine grade oil having a viscosity of 300 S.S.U. at 100° F.

Heretofore, various methods, such as under-sintering, higher specific gravity, lower permeability, and higher graphite content have been investigated in an effort to reduce the resonance in bearings. The result of this early work was the development of low resonance bearing materials which answered the majority of needs of the recent past. As sound engineers have developed greater fidelity in their equipment, they have become increasingly disturbed by the whir and scraping which is present in most available component motors. These disturbances have been attributed to shaft or bearing noises. It has been the purpose of this invention to isolate and eliminate the residual causes of bearing noises.

Continued investigation of bearings from units considered noisy by today's standards revealed that very fine copper or bronze powder in the oil film appears to cause the noises complained of. Further inquiry revealed that all sintered bronze bearings, regardless of the degree of sintering, have minute amounts of free copper or bronze interstitially trapped in the capillaries of the bearing structure. These particles, contrary to prior beliefs in the industry, it was found, are not completely removed during the oil impregnation process, even under repeated vacuum and pressure cycling. Some particles get into the impregnating lubricant despite centrifuging and filtering. The powdered particles trapped in the outer capillaries of the bearing are forced out in the oil film at the bearing surface as the film is being generated by the higher coefficient of expansion of the lubricant as compared to that of the sintered bearing. These particles, not normally a factor in bearing performance because of their small size and due to the fact that they are easily embedded in the sintered bearing, have now been identified as giving rise to the noise problem in critical applications. Evidence is also present that these same particles may be the cause of whir and uneven oil films in high speed applications.

The discovery of the cause of sintered bearing noise did not lead to an immediate solution of the problem. Normal washing and cleaning methods, including agitation, were tried. While all cleaning methods removed some of the particles from the surface pores, none could remove all of the particles trapped in the finer and deeper capillaries. A study of ultrasonic principles offered hope that this latter technique might remove these entrapped particles through the implosion of millions of small air bubbles directly into the capillary structures. Further inquiry into the effect of ultrasonic treatment of sintered bearings confirmed this hope. Bearings which were considered clean by prior standards, having been washed in toluol under agitation, were further processed by ultrasonic treatment and the amount of metal particles removed was very revealing.

The full benefit of ultrasonic treatment is obtained by coupling the bearing to the transducers of the treating equipment by means of a liquid medium which interferes as little as possible with the transmission of the ultrasonic impulses. This requirement suggested a liquid of low viscosity. However, there is also the problem of obtaining and maintaining the correct balance of the cleaning effect of the process and the need for maintaining the proper surface characteristics of the bearings. It is extremely important that the capillaries of the bearings be kept free of contaminants which might result in other problems, such as electrolytic corrosion. Another serious problem revolved about the danger of removing too much of the lubricant from the bearings under treatment.

At an early stage of the investigation, it was believed that water, particularly water with an added wetting agent, would provide an ideal medium in which to subject bearings to ultrasonic action. Indeed, water proved to be an excellent coupling agent. However, such serious difficulties with water were soon observed as to render its use undesirable. In the first place, water so seriously spotted the bearings as to impair their quality. More serious, however, is the fact that when water is used in the treating process, it is necessary to apply heat to the treated bearings in order to dry them. A final heating step to dry the bearings cannot be tolerated because the extra handling and the extra equipment required increase the bearing cost and makes them non-competitive with similar bearings which do not require heat treatment for drying. Even more important is the fact that heating oil-impregnated bearings for the purpose of drying them causes a significant loss of the lubricant with which they are impregnated.

It was eventually recognized that a volatile hydrocarbon solvent, when used as a coupler in the treating process, would evaporate from the bearing surface, without heating, so quickly as to eliminate any need for the application of heat. Furthermore, such a liquid medium would not spot the bearing surfaces. Moreover, it was not until the early experience, with hydrocarbon solvents, disclosed the loss of up to 50% of the lubricant from the bearing that it was understood that only a medium having a low solvency might be employed.

The invention, therefore, is based on an understanding of two heretofore unknown factors. It was first necessary to recognize that the persistence of noise in what were believed to be perfectly clean lubricant-impregnated sintered bearings is due to the presence of interstitial free metal powder particles within the bearing structure. It was then necessary to appreciate that the free metal powder particles could be removed from the bearings by ultrasonic treatment without damage to the bearings only by employing a bath having a low viscosity, high volatility and low solvency.

The invention in its broadest aspect, therefore, is the method of treating oil-impregnated sintered bearings to render them noiseless which comprises the immersion of such bearings in a liquid medium of low viscosity, high volatility, and low solvency, and subjecting the bearings so immersed to the action of ultrasonic impulses to remove interstitial free particles of metal powder from which the bearings are formed.

In its more particular practice, the method contemplates the immersion of lubricant-impregnated sintered bearings in a petroleum aliphatic solvent having a Kauri Butanol value within the range of 25 to 50, and an ASTM distillation range of no more than 40° F., and then subjecting the immersed bearings to the action of ultrasonic impulses to remove the residual interstitial free particles of the metal powder from which the bearings are formed. When so subjected to ultrasonic impulses of 30,000 to 35,000 cycles per second, all traces of free metal powder are removed from the bearing structure in from 3 to 5 minutes. In this regard, it should be noted that not only are the ultrasonic impulses an active instrument in the treatment, but the mild solvent action of the coupling liquid also accelerates and enhances the treatment. Bearings subject to the above treatment are found to retain substantially all of the lubricant with which they are impregnated. An average of 98% retained lubricant can be expected.

In the practical use of the method, use has been made of a petroleum aliphatic solvent of Hess Oil Chemical Corporation of Perth Amboy, N.J., designated by them as "310 Solvent." This particular solvent has an initial boiling point of 308° F. and a dry end point of 343° F. Its Kauri Butanol value is 33.0. A quantity of this solvent was placed in an ultrasonic tank having an open top. Transducers attached to the bottom of the tank were then excited and continued in operation until the solvent reached a temperature of 140° F. to which it was raised and at which it was maintained by the ultrasonic action. If the method is performed under conditions in which the ultrasonic energy fails to elevate the temperature of the treating bath, it is advantageous to elevate the bath temperature to about 150° F. by applied heat.

The bottom of an expanded metal basket was then covered with about 4 layers of sintered bearings. It should be stated that the efficiency of the process deteriorates rapidly if the batch of bearings being treated substantially exceeds 3 to 5 layers covering the bottom of the basket. The bearings of the particular example under discussion were generally spherical having an overall diameter and length of about .625", and a wall thickness of about .200 of an inch. These bearings were formed of sintered materials and were impregnated under vacuum with a turbine grade oil having a viscosity of 300 S.S.U. at 100° F.

The bearings in the basket were then immersed in the solvent and the ultrasonic treatment was continued at between 30,000 and 35,000 cycles per second for a period of 4 minutes. In the meanwhile, the solvent was recycled through a 10 micron filter to remove free metal powder and other loose foreign particles.

After about 4 minutes of treatment, the bearings were removed from the bath and were allowed to dry under an exhaust hood at room temperature. The bearings dried very quickly due to the high volatility of the solvent and the residual heat in the bearings due to the maintenance of the treating bath at approximately 140° F. The drying time, depending on atmospheric conditions and the precise composition of the coupling solvent, may vary somewhat within a range of 5 to 10 minutes.

When the bearings, treated as above, were examined, they were found to be entirely free of surface spots due to the treating solution, as well as any other surface blemishes. The retained bearing oil was about 98% of that with which the bearings were originally impregnated. Upon test for freedom from noise, it was found that the bearings so treated were far superior to similar bearings made according to the best conventional practices. Substantially all of the bearings treated according to the method operated in a high fidelity sound environment without causing detectable noise.

An entirely unexpected improvement in the physical characteristics has been found in bearings treated according to the method. Ten motors equipped with the oil-impregnated sintered bronze bearings treated according to the method were operated for 1,000 hours each at a speed of 20,000 r.p.m. under conditions of imbalance, and when the bearings were examined, it was found that the bearing surfaces had suffered wear of only .0002 of an inch, and that the oil film was in perfect condition; a condition only remotely approached by bearings of the same structure and composition but without the benefit of the ultrasonic treatment of the present invention.

Variations in the size of the bearings under treatment does not materially affect the successful operation of the method within the stated parameters. Very small bearings can be fully processed by subjecting them to the treatment for a minimum length of time. The quality of substantially larger bearings is not materially enhanced by extending the treatment beyond a maximum of 5 minutes.

What is claimed is:

1. The method of treating oil-impregnated sintered metal bearings to render them noiseless by removing therefrom interstitially trapped metal particles which comprises the immersion of such bearings in a petroleum aliphatic solvent of low viscosity to insure the effective coupling of such bearings with a source of ultrasonic impulses, of low solvency to preserve within said bearings all of the impregnating oil thereof and of high volatility to permit rapid drying at ambient temperature to avoid surfaces blemishes, such solvent having an initial boiling point of about 308° F. and a dry end point of about 343° F. and a Kauri Butanol value within the range of 25 to 50, elevating the temperature of said solvent to about 150° F., subjecting the bearings so immersed to the action of ultrasonic impulses for a period of about 3 to 5 minutes to remove interstitial free particles of metal powder from which such bearings are formed, and thereafter removing said bearings from said solvent and permitting the same to dry at ambient temperature.

2. The method of claim 1, in which said solvent has a Kauri Butanol value of approximately 33.0 and in which the bearings are subjected to the ultrasonic impulses within the range of 30,000 to 35,000 cycles per second.

3. The method of claim 1, in which the drying operation is performed under an exhaust hood whereby the drying operation is accelerated and the driving off of impregnating oil by elevationed temperature is avoided.

References Cited

UNITED STATES PATENTS

| | | | |
|---|---|---|---|
| 2,779,695 | 1/1957 | Brown | 134—1 |
| 2,828,231 | 3/1958 | Henry | 134—1 |
| 2,860,646 | 11/1958 | Zucker | 134—1 X |
| 3,019,800 | 2/1962 | Rand | 134—1 X |
| 3,156,248 | 11/1964 | Rand | 134—1 X |

OTHER REFERENCES

Solvents Guide, Marsden/Mann, Interscience Publishers, a division of John Wiley & Sons, Inc., New York, 1963. Title page and page 548 relied on.

MORRIS O. WOLK, *Primary Examiner.*

J. ZATARGA, *Assistant Examiner.*